Patented Oct. 7, 1941

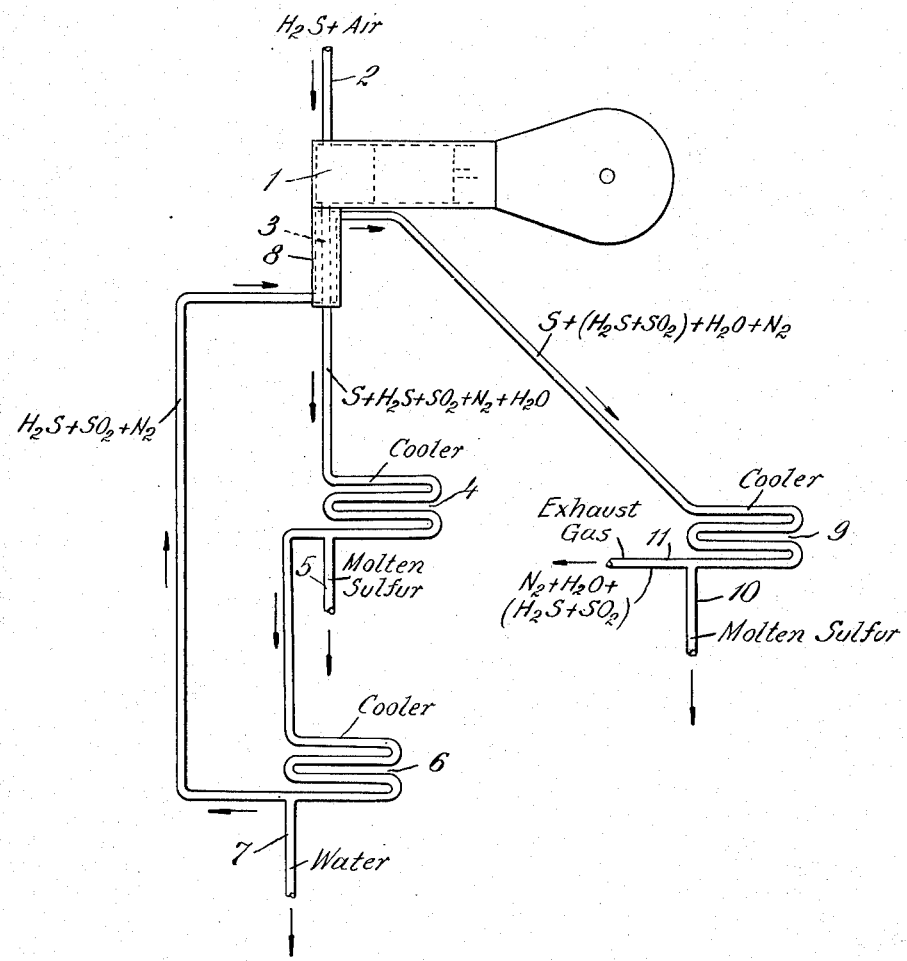

2,258,305

UNITED STATES PATENT OFFICE 2,258,305

PRODUCTION OF SULPHUR FROM HYDROGEN SULPHIDE

Eugene D. Stirlen, New Haven, Conn., assignor to General Chemical Company, New York, N. Y., a corporation of New York Application July 29, 1939, Serial No. 287,364

3 Claims. (Cl. 23—225)

This invention relates to a process for the production of sulphur from hydrogen sulphide.

It is known hydrogen sulphide may be burned with a limited supply of air to form sulphur and water. This burning of the hydrogen sulphide may be a flame combustion and it may be carried out by catalyzing a mixture of hydrogen sulphide and air in appropriate proportions.

I have now discovered the combustion of hydrogen sulphide with air to form sulphur may be carried out in an internal combustion engine whereby sulphur may be produced and at the same time mechanical energy be obtained by means of the engine.

It is known hydrogen sulphide and air in appropriate proportions form a combustible mixture. It is known, however, that in operating internal combustion engines on ordinary fuels used for that purpose such as petroleum products or on the gaseous fuels such as illuminating gas, which have heretofore been used to some extent, proper operation of the engine requires the use of closely controlled mixtures of the fuel and air and all combustible mixtures of these materials will not properly operate an internal combustion engine. I have discovered, however, that in an internal combustion engine a mixture of hydrogen sulphide and air in proportions forming free sulphur by partial combustion only of the hydrogen sulphide burns satisfactorily for smooth operation of the engine and production of power therefrom in addition to the formation of an exhaust gas from the engine from which the free sulphur may be recovered by, for example, cooling the gas. Further, it is known the sulphur content of petroleum fuels marketed for use in internal combustion engines is closely controlled at a very low value in order to avoid corrosion of the engine. I have, on the other hand, burned mixtures of hydrogen sulphide and air in an internal combustion engine to form free sulphur and have observed no corrosion of the engine due to the use of the sulphur-containing fuel. I observed the precaution to keep the parts of the engine which were in contact with the combustion products of the hydrogen sulphide-air mixture at temperatures of substantially 240° F. and higher at which the sulphur does not solidify in the engine.

In carrying out the process of this invention the fuel supplied for operation of an internal combustion engine is preferably a gas of which 90% or more of the combustible constituents of the gas is hydrogen sulphide. Substantially pure hydrogen sulphide may be used or a gas containing 1% to 5% of hydrocarbon products with the remainder substantially consisting of hydrogen sulphide. A gas containing about 50% each of hydrogen sulphide and carbon dioxide is obtained from one method of treating petroleum products, and such a gas is suitable as a fuel for an internal combustion engine in carrying out the process of this invention.

The mixture of fuel and oxygen supplied to the combustion chambers of the engine may be varied within a relatively wide range. Thus, the fuel-oxygen mixtures introduced into the combustion chambers of the engine may contain from 0.5 to 0.7 volume of oxygen for combustion of every 1 volume of hydrogen sulphide and 2 to 2.8 volumes of non-combustible gas for every 1 volume of hydrogen sulphide. This corresponds to mixtures containing 2.5 to 3.5 volumes of air for combustion of every 1 volume of hydrogen sulphide. As examples of suitable fuel-air ratios I have used mixtures of hydrogen sulphide and air containing 23.2% $H_2S$ (3.15 cubic feet of $H_2S$ to 10.4 cubic feet of air) and containing 25.6% $H_2S$ (3.4 cubic feet of $H_2S$ to 9.9 cubic feet of air) in operating an internal combustion engine and in both cases about 72% of the sulphur content of the hydrogen sulphide was converted to free sulphur. I prefer to supply to the engine mixtures of air and a gas substantially consisting of hydrogen sulphide in the proportions of 2.5 to 2.9 volumes of air for combustion of every 1 volume of hydrogen sulphide. When the fuel fed to the engine contains combustible constituents other than the hydrogen sulphide, oxygen may be supplied to burn these other constituents and thus increase the energy recovered from the gas. With such fuels, in addition to the proportions of oxygen supplied for burning the hydrogen sulphide as set forth hereinabove, an additional amount of oxygen may be added sufficient to burn the combustible gases other than hydrogen sulphide to carbon monoxide and water.

In carrying out the process of my invention, a part of the hydrogen sulphide fed to the engine may remain unburned and a part may be burned to sulphur dioxide. If desired, therefore, the exhaust gas from the engine may be catalyzed, with or without first adjusting its hydrogen sulphide, sulphur dioxide and oxygen content, to further decompose the hydrogen sulphide contained in the exhaust gas to liberate sulphur therefrom by reaction with sulphur dioxide or oxygen.

In burning hydrogen sulphide in an internal combustion engine in accordance with the process of this invention, it is preferred to start up the engine on a fuel such as gasoline or illuminating gas and, after the engine has been heated up to a temperature at which sulphur will not solidify in the engine (temperatures of 240° F. and higher), to change the fuel supplied to the hydrogen sulphide gas. Before shutting down the operation of the engine it should also be run on gasoline or illuminating gas long enough to clear the engine of vapors of sulphur and sulphur compounds. Unless this precaution is taken, sulphur left in the engine will condense and solidify on the walls of the combustion chambers and before the engine can again be started up, it may be necessary to remove this sulphur by burning it out, for example, with oxygen.

Some hydrogen sulphide gases suitable for use in carrying out the process of this invention may contain hydrocarbon compounds of objectionable odor. In order to prevent such materials from affecting the commercial value of the sulphur product, the air-fuel mixture supplied to the engine should contain sufficient air to burn these hydrocarbons and the temperature at which the combustion takes place in the engine should be maintained high enough to destroy these hydrocarbons. This temperature may be controlled, for example, by using an excess of air in the fuel-air mixture supplied to the engine over that theoretically required for combustion of the hydrogen sulphide to sulphur and water and of the hydrocarbon compounds, or by any known method for controlling the temperature of operation of an internal combustion engine.

While the proportions of hydrogen sulphide and air used in operating the engine in accordance with the process of this invention may be varied over a relatively wide range, the optimum mixture for the production of sulphur will vary with different types of internal combustion engines. Furthermore, if it is desired to develop a large amount of energy from the engine rather than obtain the largest amount of free sulphur by combustion of the hydrogen sulphide, the proportion of hydrogen sulphide to air will be varied. As the proportion of air is increased the amount of power developed increases, although at the same time more of the hydrogen sulphide is burned to sulphur dioxide.

In the accompanying drawing there is illustrated diagrammatically a preferred example of a process operating in accordance with my invention.

With reference to the drawing, the numeral 1 designates the combustion chamber of an internal combustion engine to which a mixture of air and a gas substantially consisting of hydrogen sulphide is supplied from the intake pipe 2. This fuel-air mixture contains 2.5 to 2.9 volumes of air for every 1 volume of hydrogen sulphide. The hydrogen sulphide gas may be saturated with water at atmospheric temperatures when mixed with the air. The combustible mixture of hydrogen sulfide and air is burned in combustion chamber 1 of the engine in the usual manner to operate this engine and the power thus obtained utilized in any desired manner. The products of combustion of hydrogen sulphide and air pass out of the engine through the exhaust pipe 3. These gases may contain for example, elemental sulphur in amount corresponding to about 75% of the sulphur content of the hydrogen sulphide supplied to the engine. They also contain small percentages of hydrogen sulphide and sulphur dioxide.

The combustion products leaving exhaust pipe 3 are passed first through a cooler 4 in which they are cooled to about 250° F. to condense the sulphur, which is drawn off through a branch pipe 5. The uncondensed hydrogen sulphide and sulphur dioxide accompanied by the nitrogen and water contained in the exhaust gases pass through a second cooler 6 in which the gases are cooled to about atmospheric temperature to condense water which is drawn off through a branch pipe 7. The gases uncondensed in cooler 6 are passed within a jacket 8 around exhaust pipe 3 and are heated by indirect heat transfer from the hot exhaust gases leaving the combustion chamber of the engine. By thus heating the gases to a temperature of about 500° F. or higher, hydrogen sulphide and sulphur dioxide contained therein react to form sulphur and water. If desired, the space between jacket 8 and exhaust pipe 3 may be packed with a heat-conducting material to facilitate the heating up of the gases and the space likewise may contain a catalytic material to promote the reaction of the hydrogen sulphide and the sulphur dioxide. The gases passing out of jacket 8 are passed through a cooler 9 in which they are cooled to about 250° F. to condense the sulphur which is drawn off through a branch pipe 10. The remaining uncondensed gases pass to the atmosphere through pipe 11 or they may be treated as desired.

I claim:

1. The process for the production of sulphur from hydrogen sulphide and air which comprises operating an internal combustion engine on a fuel-air mixture of a hydrogen sulphide gas mixed with air in amount sufficient for partial combustion only of the hydrogen sulphide, thereby forming an exhaust gas from said engine containing sulphur, hydrogen sulphide, sulphur dioxide and water, cooling said exhaust gas to a temperature at which sulphur condenses therefrom, further cooling the gas to condense water therefrom, heating the uncondensed gas to a temperature at which hydrogen sulphide and sulphur dioxide contained therein react to form sulphur and cooling the resulting gas to condense sulphur therefrom.

2. The process for the production of sulphur from hydrogen sulphide which comprises burning in the combustion chamber of an internal combustion engine a mixture of hydrogen sulphide gas and air containing 2.5 to 2.9 volumes of air for combustion of every 1 volume of hydrogen sulphide, thereby forming a combustion product containing elemental sulphur, hydrogen sulphide, sulphur dioxide and water which passes out of the engine in the hot exhaust gases therefrom, cooling said exhaust gas to about 250° F. to condense sulphur therefrom, separating the condensed sulphur from the uncondensed gas, further cooling the uncondensed gas to condense water therefrom, separating the condensed water from the uncondensed gas, passing the last mentioned uncondensed gas in indirect heat exchange with the aforesaid hot exhaust gases to heat the uncondensed gas to a temperature at which hydrogen sulphide and sulphur dioxide contained therein react to form sulphur and cooling the resulting gas to condense sulphur therefrom.

3. The process for the production of sulphur from hydrogen sulphide and air which comprises operating an internal combustion engine on a fuel-air mixture of a hydrogen sulphide gas mixed with air in amount sufficient for partial combustion only of the hydrogen sulphide, thereby forming an exhaust gas from said engine containing sulphur, hydrogen sulphide, sulphur dioxide and water, cooling said exhaust gas to a temperature at which sulphur condenses therefrom, further cooling the gas to condense water therefrom, heating the uncondensed gas and passing it in contact with a catalyst promoting the reaction of hydrogen sulphide and sulphur dioxide to form sulphur, said uncondensed gas being contacted with the catalyst at a temperature at which hydrogen sulphide and sulphur dioxide contained in the gas react to form sulphur and cooling the resulting gas to condense sulphur therefrom.

EUGENE D. STIRLEN.